United States Patent [19]

Holmes

[11] 4,350,183

[45] Sep. 21, 1982

[54] HEAT-RECOVERABLE PIPELINE TERMINATION PLUG

[75] Inventor: James C. Holmes, San Francisco, Calif.

[73] Assignee: Raychem Corporation, Menlo Park, Calif.

[21] Appl. No.: 150,840

[22] Filed: May 19, 1980

[51] Int. Cl.³ .............................................. F16L 55/10
[52] U.S. Cl. ..................................... 138/89; 138/178; 428/913
[58] Field of Search .................. 138/89, 103, 178, 93, 138/94; 174/DIG. 8; 264/230; 428/913

[56] References Cited

U.S. PATENT DOCUMENTS

| | | | |
|---|---|---|---|
| 3,276,481 | 10/1966 | McNulty | 138/93 |
| 3,396,460 | 8/1968 | Wetmore | 174/DIG. 8 |
| 3,847,183 | 11/1974 | Meyer | 138/89 X |
| 3,904,111 | 9/1975 | Petersson | 138/89 X |
| 4,044,798 | 8/1977 | Feldstein et al. | |
| 4,181,775 | 1/1980 | Corke | 174/DIG. 8 X |
| 4,197,880 | 4/1980 | Cordia | 138/99 |
| 4,237,609 | 12/1980 | Clabburn et al. | |
| 4,268,041 | 5/1981 | Sovish et al. | 174/DIG. 8 X |
| 4,295,494 | 10/1981 | McGowan et al. | 138/89 |

FOREIGN PATENT DOCUMENTS

| | | |
|---|---|---|
| 2440086 | 3/1974 | Fed. Rep. of Germany . |
| 1224256 | 6/1960 | France . |
| 2335786 | 7/1977 | France . |
| 345554 | 3/1931 | United Kingdom . |
| 852216 | 9/1955 | United Kingdom . |
| 736842 | 10/1960 | United Kingdom . |
| 1092636 | 11/1967 | United Kingdom . |
| 1155171 | 6/1969 | United Kingdom . |
| 1347252 | 2/1974 | United Kingdom . |
| 1488393 | 10/1977 | United Kingdom . |
| 1518425 | 7/1978 | United Kingdom . |
| 1532978 | 11/1978 | United Kingdom . |
| 1543767 | 4/1979 | United Kingdom . |
| 1548964 | 7/1979 | United Kingdom . |
| 1553427 | 9/1979 | United Kingdom . |
| 1554431 | 10/1979 | United Kingdom . |
| 1554432 | 10/1979 | United Kingdom . |
| 1554433 | 10/1979 | United Kingdom . |
| 1557412 | 12/1979 | United Kingdom . |
| 1576356 | 10/1980 | United Kingdom . |

OTHER PUBLICATIONS

Peter J. Kassak, "Low Cost Method for Abandoning Inactive Service" *Corrosion Control Handbook*, 4th Ed., Energy Communications, Inc., Pub., pp. 215-217 (1975).

"Research Vital to Polytechnic", *Polytechnic Cable*, Polytechnic Institute of New York, Pub., pp. 1 and 2, (Nov. 1979).

*Primary Examiner*—James E. Bryant, III
*Attorney, Agent, or Firm*—Herbert G. Burkard

[57] ABSTRACT

A method for permanently terminating pipelines by insertion of an adhesive coated, molded plug housing containing a biasing member which is typically a spring. The molded plug housing, or the spring, or both, are of heat-recoverable materials, i.e. materials which have been formed into a shape, subsequently deformed to a reduced diameter, and which recover towards their original heat stable shape on application of heat alone. The plug is heated to recover to or toward the heat stable greater-diameter shape thereby exerting pressure against the pipeline walls, forcing the adhesive into intimate contact with the inner surfaces of the pipeline, and thus affecting a permanent seal. The adhesive is preferably of the hot-melt type.

3 Claims, 8 Drawing Figures

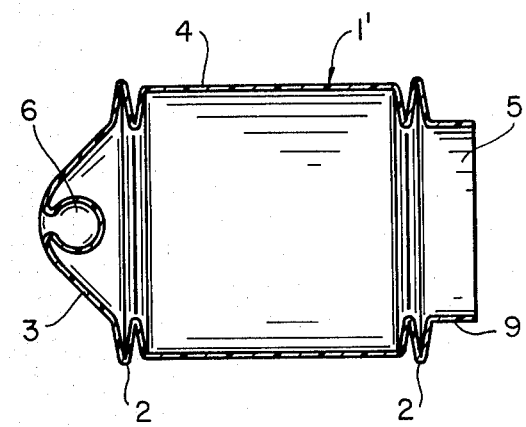
FIG_1
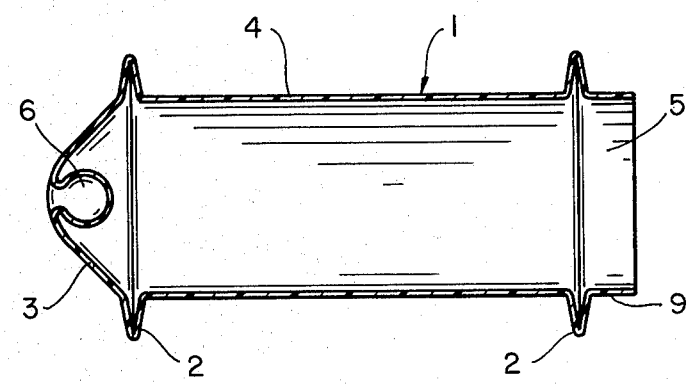
FIG_2
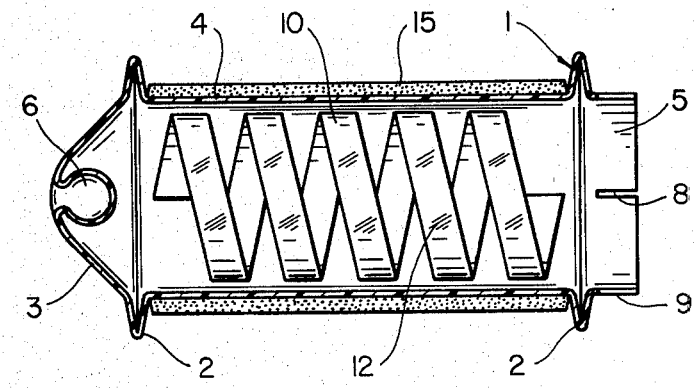
FIG_3

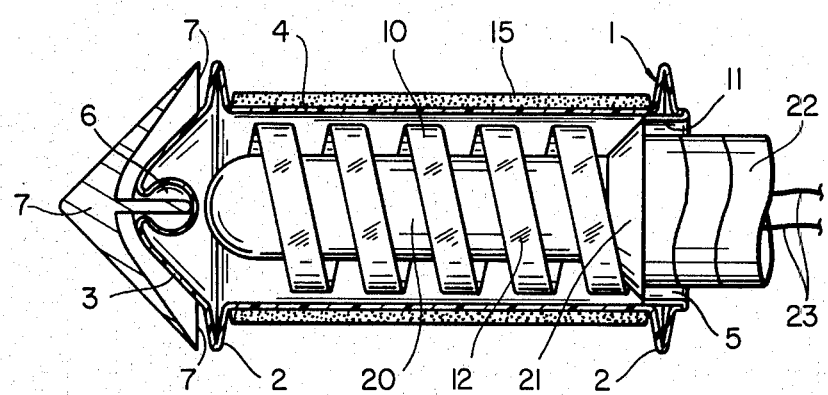
FIG_4
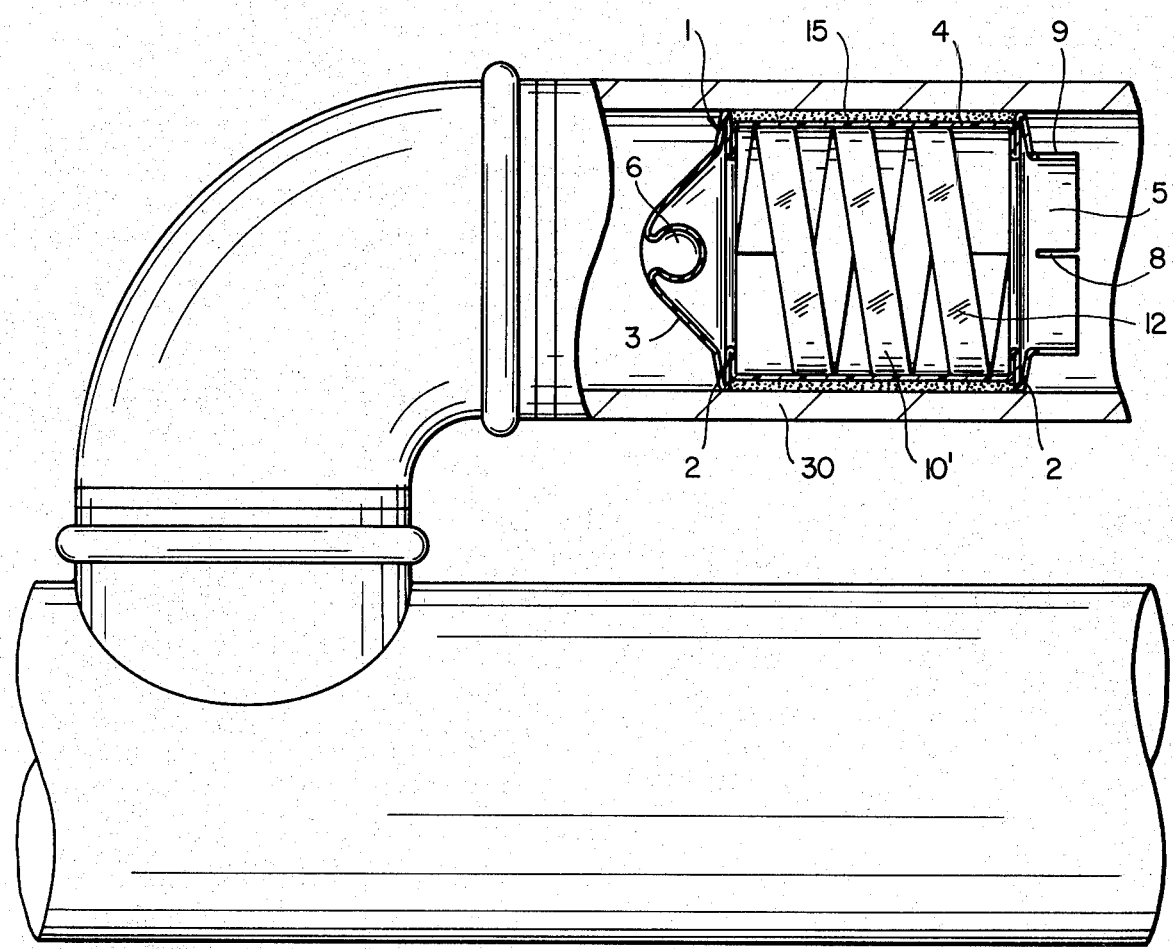
FIG_5

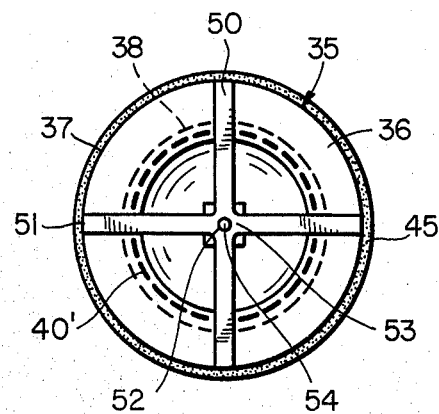
FIG_6
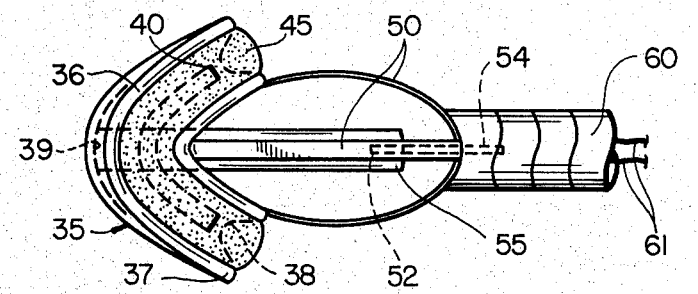
FIG_7
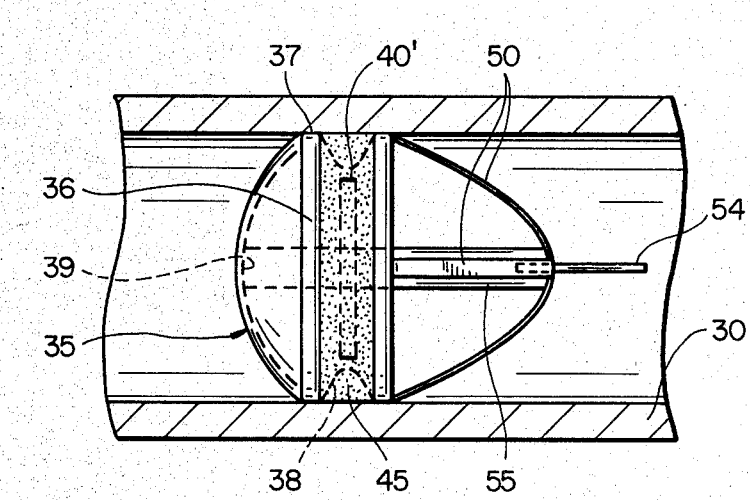
FIG_8

HEAT-RECOVERABLE PIPELINE TERMINATION PLUG

BACKGROUND OF THE INVENTION

1. Field of the Invention

This invention relates to the permanent termination of fluid flow in pipelines by sealing the pipeline internally, and more particularly to an adhesive coated heat-recoverable pipeline internal termination plug which is inserted and subsequently heated to effect a return to or towards its original greater-diameter configuration, thereby exerting pressure against the pipeline walls, and contacting the adhesive coating thereagainst to affect a permanent seal.

2. Description of Prior Art

Inactive utility pipeline services develop no revenue for the supplier yet permanent abandonment to meet federal, state and local standards tranditionally necessitates a costly street excavation which is pure cost to the supplier and which presents a traffic nuisance to the public. Inactive pipelines in general present a wasteful leak potential and in the case of utility gas pipelines, a potentially explosive leak hazard, which is compounded by the problem of accelerated electrochemical corrosive deterioration at the capped ends of stub services. Urban renewal and changeovers to alternate fuels and power sources as a fallout of the current energy crisis have focused attention on the need for a method to permanently abandon inactive pipelines at reasonable cost.

An internally-placed seal or plug inserted at the heat of the service such as in a building basement or through a curb valve or through a low cost opening inside the curb would result in most significant cost savings by eliminating the need for the substantially more costly and more time consuming street excavation, subsequent closure and repaving. To that end, a method of filling the fittings at the main with a plug of epoxy material is described in "Low Cost Method For Abandoning Inactive Service", Peter J. Kassak, *Corrosion Control Handbook*, 4th Ed., Energy Communications, Inc., Pub., pps. 215–217, (1975). A collapsed umbrella of copper leaves is positioned inside the main and pulled back and secured against the service tap. Viscous epoxy plugging compound is mixed and loaded into a cartridge which is pushed down the service pipeline. The material is pushed out of the cartridge to fill the umbrella and to pack material against the inside of the main at the tap.

The effective sealing lifetime of the epoxy plug is questionable. Thermal expansion mismatch between the pipe material and the epoxy can result in destruction of sealing integrity over the years, a distinct disadvantage, especially in climates characterized by ground frost conditions and where water seepage into corroded service lines substantially stresses pipeline materials when the water freezes.

Sealing integrity is further disadvantaged by the geometries of the umbrella backstop with its copper leaves and the packing material with its irregular array, which are positioned in the main itself and extend into the fittings. Routine pipeline maintenance cleaning called "pigging" is commonly accomplished by dragging a cleaning brush or ball through the main. Any obstruction in the main can snag the pigging tool while predictably, dislodging the snag stresses the integrity of the obstruction, i.e. the subject sealing plug. Main obstruction is inherent in this system. Even backstopping alternates, such as the inflatable/deflatable balloon described in U.S. Pat. No. 3,607,361, "Balloon Backing for Pipe Lining", do not resolve the disadvantage completely. Some degree of obstruction is still present and debris is introduced into the main.

The on-site need to mix chemicals is a further complicating disadvantage of this prior art system. Moreover, the limited workable lifetime after mixing of a curable epoxy system requires a more highly skilled insertion crew and thus is an additional logistical disadvantage. The crew might break for lunch, for example, and subsequent insertion of the epoxy might be accomplished when the curing material is past the point of optimum bond formation with the pipe material since once a certain stage of cure has been reached, epoxy containing materials are not intrinsically adhesive.

These disadvantages have stimulated a continuing search for a suitable internally-placed pipeline sealing system. One alternate solution is described in "Research Vital to Polytechnic", *Polytechnic Cable,* Polytechnic Institute of New York, Pub., pps. 1 and 2, (Nov. 1979). This publication describes a plug utilizing an actuating rod made of titanium-nickel memory alloy. Memory alloys are alloy materials which remember a preprogrammed shape imparted to them at a temperature slightly above ambient because of a crystallographic phase transformation. The shape can then be altered at room temperature and stored at room temperature (or lower) for an indefinite time. Return to the remembered shape is accomplished by heating the part to a characteristic transformation temperature.

The polytechnic actuating rod is centered in a metal cylinder of about 3 inches in length and 1.3 inches in diameter after the rod has been stretched to 0.25 inches longer than its original length. Two neoprene rubber plugs are attached, one on each end. After insertion into the pipeline, heat is applied via electric current. The shrinking memory alloy exerts force on the rubber plugs which expand and bulge on each side forming a seal.

These blind plugs are apparently commercially inadequate and are not being marketed. The effective sealing lifetime of such a plug is questionable due to the deterioration characteristic of neoprene rubbers over time, such as oxidative embrittlement. The integrity of this seal results solely for the two rubber plugs and is a function of their elasticity which common knowledge and experience teaches is limited due to deterioration in service.

Moreover, the memory alloy relaxes on cooling below its transformation temperature and ceases to attempt to return further towards its undeformed shape. Thus, the rubber plugs are not continuously further biased once the rod is cooled, hence the nomer, "actuating" rod. The rubber will tend to attempt to return to a more relaxed configuration with time, such as by creep or cold flow, adversely affecting the permanence of the seal. Under the stress of pipeline pressures, typically $\frac{1}{4}$ or $\frac{1}{2}$ psi from the main side, the plug could leak, "walk" or even blowout. Neoprene rubbers are, of course, not intrinsically adhesive.

SUMMARY OF THE INVENTION

In accordance with the present invention, there is provided a heat-recoverable pipeline termination plug which is an adhesive coated, molded plug housing containing a biasing means which is typically a spring. The molded plug housing or the spring, or preferably both, are of heat-recoverable materials. These materials are used to provide an expansion heat-triggered mechanism for the plug. After insertion of the assembled plug, it is heated to recover to or towards its heat stable configuration of greater-diameter, thereby exerting pressure against the pipeline walls, forcing the adhesive into intimate contact with the inner wall surfaces of the pipeline, and thus effecting a permanent bonded seal.

Heat-recoverable materials are those which are said to have a memory. This memory or more particularly, this preprogrammed heat stable shape, can be due to a characteristic known as elastic memory in the case of polymeric materials or to a crystallographic phase transformation in the case of certain alloys.

The term heat stable configuration denotes an article which does not undergo any significant change in shape if heated at or above its melting or softening temperature if a polymer or at or above its transformation temperature, but below its melting point if a metal or metal alloy.

The term heat unstable denotes an article deformed from its heat stable configuration which will recover to or towards said heat stable configuration upon application of heat alone.

Certain polymeric materials, well known in the art can be molded and cross-linked by chemical cross-linking agents such as peroxides while in the mold, or by ionizing radiation after a shaping operation, thereby producing an article in a heat stable configuration. These materials can then be deformed into a different shape, usually at temperatures above the melting point of the polymer. They maintain this second shape indefinitely until heated to the recovery temperature characteristic of the material, at which temperature they recover to or towards their original heat stable shape. The molded plug housing can be fabricated from such a polymeric material.

The molded plug housing or the spring can alternatively be fabricated from certain metal alloy materials which are formed to a heat stable shape. These memory alloys are characterized by certain well known crystallographic phase transformations which allow a heat stable shape to be imparted to them. An article is fabricated by casting, rolling or stamping, for example, and/or otherwise formed into the heat stable configuration. The article is then deformed at ambient or below its transformation temperature into a different shape. This second shape is maintained indefinitely until heated to a memory transition temperature characteristic of the particular alloy composition, at which temperature the article recovers to or towards its heat stable configuration.

An object of the present invention is to provide a method for permanently terminating pipelines by insertion of a heat-recoverable pipeline termination plug.

Another object of the present invention is to provide a method for permanently terminating pipelines which is low in cost because it eliminates the need for street excavations by allowing internal placement of the plug and which provides a highly reliable permanent seal with a lifetime at least as long as the pipeline itself.

Still another object of the present invention is to provide a method for permanently terminating branch pipelines which does not protrude into and obstruct the main, but rather is placed in the service tap in or as close to the main as possible but not protruding into the main.

A further object of the invention is to eliminate the need for on-site mixing of chemicals, especially those which are reactive and have a limited workable lifetime.

Yet a further object of the invention is to use materials in the termination plug which do not deteriorate over the lifetime of the plugged pipeline.

A still further object of the present invention is to use a material for accomplishing the permanent seal which is intrinsically an adhesive material and which forms a permanent bond with the pipeline material.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect, without limiting the improvements in their useful application or to the particular construction, which for purposes of explanation have been made the subject of illustration.

BRIEF DESCRIPTION OF THE DRAWINGS

FIG. 1 is a cross-sectional view of a molded polymeric plug housing which has been cross-linked to a heat stable shape.

FIG. 2 is cross-sectional view of the molded polymeric plug housing after it has been deformed to a reduced diameter.

FIG. 3 is a cross-sectional view of the molded, deformed polymeric plug housing after it has been externally coated with adhesive and loaded with a spring which has also been formed to a heat stable shape, then deformed to a reduced diameter.

FIG. 4 is a cross-sectional view of the adhesive coated housing after the housing wall has been folded inward to form a retaining flap for a cartridge heater assembly, illustrating one embodiment of the invention ready for insertion into a pipeline.

FIG. 5 is a cross-sectional cutaway view of the plug after insertion into the pipeline and heating to accomplish heat-recovery to or towards the original shapes of the housing and of the spring, showing the intimate contact of the adhesive to the pipeline wall, illustrating one embodiment of the invention after internal placement.

FIG. 6 is a front view of a diaphragm with an integrally inserted heat-recoverable spring. The diaphragm defines a trough along its outer perimeter which contains a generous bead of adhesive. Shown also are the guide pin, spacer and crossed guides of the guide means.

FIG. 7 is a side view of the diaphagm after the integrally inserted heat-recoverable spring has been deformed into a reduced diameter configuration and connected to an insertion tool, illustrating another embodiment of the invention ready for insertion.

FIG. 8 is a cross-sectional view of the plug after insertion into the pipeline and after resistive heating via electric current to accomplish heat-recovery to or towards the heat stable greater-diameter shape of the spring, showing the intimate contact of the adhesive with the pipeline wall, illustrating another embodiment of the invention after internal placement.

DESCRIPTION OF PREFERRED EMBODIMENTS

Referring to the drawings and particularly to FIG. 4, a most preferred embodiment of the heat-recoverable pipeline termination plug of the present invention includes a housing, 1, a biasing means which is a spring, 10, and a sealing means which is an adhesive coating, 15. The housing, 1, is a hollow cylindrical molded structure fabricated from a polymeric material, such as polyethylene, which exhibits heat-recoverable behavior. FIG. 1 shows the molded housing after cross-linking to a heat stable housing shape, 1', by means of chemical cross-linking agents such as peroxides or by means of ionizing radiation. FIG. 2 shows a molded housing, 1, after it has been deformed to a reduced diameter at an elevated temperature.

Referring to FIG. 3 the spring, 10, is fabricated from a memory metal alloy material, such as a copper based alloy as described in U.S. Pat. Nos. 3,783,037 and 3,802,930. A rolled and stamped cut sheet is formed to impart a stable spring shape, 10', (as shown in FIG. 5), shown in this most preferred embodiment as a spiral spring, although many alternative spring configurations would be operational. FIG. 3 shows a spring, 10, after it has been deformed at ambient into a reduced diameter and inserted into the housing.

With continued reference to FIG. 3, the housing, 1, has a closed insertion-end, 3, which leads the insertion advance of the plug, cylindrical walls, 4, and an open tail-end, 5, adapted to receive an insertion tool. The closed insertion-end, 3, defines a cavity which is a guide means receptical, 6, for facilitating connection of a guide means which is a spring-loaded umbrella like means, 7, (shown in FIG. 4) if one should be necessary or adventageous. The spring-loaded umbrella like means, 7, can be press-fitted or glued into the guide means receptical, 6, and functions to center the plug, guiding it past minor pipeline obstructions during insertion.

The housing, 1, shown in FIG. 3 also has a sealing collar, 2, extending radially outward from the housing or more preferably a pair of sealing collars, 2, as shown. The sealing collars, 2, serve multiple functions. They retain or seal-in the adhesive during heat-recovery towards the heat stable plug shape, a distinct advantage if the adhesive coating, 15, is of the hot-melt type which might tend to flow. They also serve a guidance function helping to center the plug during insertion and a protective function, helping to reduce abrasion of the adhesive coating, 15, by the pipeline inner wall surface during insertion. The sealing collar, 2, located near open tail-end, 5, also functions as a rip stop.

Referring to FIG. 4, an end portion, 9, of the open tail-end, 5, is formed into a retainer flap, 11, by inwardly folding the cylindrical walls. The folding operation can be facilitated by a plurality of cuts, 8, hence the need for the sealing collar, 2, located near open tail-end, 5, to function as a rip stop, that is, a barrier against unwanted tearing. Retainer flap, 11, serves to retain an electrical heating element, such as a cartridge heater, 20, having a seat, 21. The heater, 20, is pressed into the housing through the open tail-end, 5, and through the spring, 10, and is retained by retainer flap, 11, by means of the larger diameter of seat, 21, which catches on the retainer flap, 11, which has a slightly smaller diameter, thereby preventing premature removal of the cartridge heater, 20. The spring, 10, functions to position the heater, 20, so as to distribute heat more evenly thereby preventing localized overheating of the polymeric housing, 1.

With continued reference to FIG. 4, the cartridge heater, 20, is attached to a flexible insertion means, such as a snake, 22. Electrical leads, 23, for the cartridge heater, 20, are threaded through the snake, 22. After insertion to the desired position, power is supplied to the cartridge heater, 20, which heats the plug assembly and accomplishes heat-recovery of the spring and of the housing to their heat stable shapes 1' and 10'.

When heat-recovery is complete, the end portion, 9, of the tail-end, 5, which formed the retainer flap, 11, will have returned to its heat stable shape. The cartridge heater, 20, will then slip easily from the housing, 1, a convenient indicator of when the heat-recovery step is complete. The power is turned off and the cartridge heater, 20, and snake, 22, are removed.

Referring to FIG. 3, the adhesive coating, 15, is most preferably a hot-melt adhesive whose melting point corresponds roughly to the recovery temperatures of the heat-recoverable elements, although many mastics and other types of adhesives perform well also. As the heat-recovery step progresses, the force of the expanding housing, 1, and the force of the expanding spring, 10, combine to press the adhesive coating, 15, into intimate contact with the inner walls of the pipeline, 30, effecting a bonded seal which is permanent.

Shown is a lubricant coating 12 for the spring, 10, for facilitating sliding of the spring, 10, against the housing, 1, when the plug is heated to its memory transition temperature. Suitable lubricants include glycerine and silicone oils for example.

This most preferred embodiment is not intended to exclude other preferred embodiments, such as, a plug in which the housing is heat-recoverable and fabricated from a shape memory alloy. Such an embodiment would be operational with a memory alloy heat-recoverable spring of, for example, $\beta$-brass, or with an ordinary spring of, for example beryllium-copper. Moreover, although the housing need be expandable, if need not be fabricated of a heat-recoverable material. It could be, for example, a cylindrical folded bellows, or a diaphragm which can be compressed.

Such a compressible polymeric diaphragm housing is shown in FIGS. 6, 7, and 8. Referring to FIG. 6, the diaphragmal housing, 35, has a thicker outer portion, 36, in doughnut fashion. It is fabricated from a polymeric material, such as, polyethylene. The outer portion, 36, has a circular spring, 40', integrally inserted therein. The spring, 40', is of heat-recoverable alloy, such as, $\beta$-brass which is formed into the shape of a circular spring before insertion into the housing's outer portion, 36.

With continued reference to FIG. 6, the outer edge, 37, of the housing's outer portion, 36, defines a trough, 38. This trough, 38, contains the sealing means which is preferably an adhesive, 45, and more preferably a hot-melt adhesive. The adhesive, 45, is deposited into the trough, 38, as a bead of generous quantity.

Shown also in FIG. 6 is a front view of the diaphragmal plug looking down onto its insertion guidance means. An array of crossed guides, 50, is attached at their uncrossed ends, 51, to the housing's outer portion, 36. The cross guides, 50, have a hole, 52, through the center of their crossed area, 53. The cross guides serve to stabilize the diaphragmal plug when it is compressed into the configuration shown in FIG. 7 and to facilitate handling and mounting to insertion tooling, 60.

With continued reference to FIG. 6, a guide pin, 54, is slidably threaded through the hole, 52, in the center of the crossed area, 53, of the crossed guides, 50. The far end of the guide pin, 54, is attached to a spacer, 55. The guide pin, 54, can define a notch (not shown) to act as a cocking mechanism when the plug is ready for insertion as shown in the configuration in FIG. 7.

The spacer, 55, rests on the inner wall of the center portion, 39, of the diaphragmal housing, 35. The other end of spacer, 55, has guide pin, 54, attached thereto. The spacer, 55, provides a stabilizing function.

Referring to FIG. 7, the circular spring 40' of FIG. 6 has been deformed to a second shape for a heat-recoverable spring, 40, also compressing the diaphragmal housing, 35, to a resulting configuration as shown. This second concono-convex shape is retained until the spring, 40, is heated to its memory transition temperature. Heat can suitably be applied via electric current. Electrical leads, 61, are threaded through the insertion tooling, 60, which most preferably is a flexible snake. The heater can alternatively be a cartridge heater or other heating element.

Referring to FIG. 8, the diaphragmal plug is shown in its final position in the pipeline, 30, after insertion by means of insertion tooling, 60, after heating to the memory transition temperature for the heat-recoverable spring, 40, to accomplish a return to its heat stable disc shape as circular spring 40', and after removal of the insertion tooling, 60. The heating operation also serves to activate or melt the adhesive, 45, if it is a hot-melt adhesive. The force of heat-recovery of spring, 40, serves to intimately contact the adhesive, 45, to the inner wall of pipeline, 30, thereby effecting a permanently bonded seal.

I claim:

1. A heat-recoverable pipeline plug comprising:
   a. a polymeric diaphragmal housing which is generally concavo-convex in shape and whose outer peripheral edge defines a trough;
   b. a heat recoverable metal spring integrally molded within said diaphragmal housing and which expands towards the inner wall surface of the pipeline when heated to its memory transition temperature to flatten the diaphragmal housing to a generally disc shape; and
   c. an adhesive sealing means contained within said trough and which is brought into contact with the inner walls of the pipeline by the force of the expanding spring to produce a seal.

2. A heat-recoverable pipeline plug comprising:
   (a) a polymeric diaphragmal housing which is generally concavo-convex in shape and whose outer edge defines a trough;
   (b) a heat-recoverable metal spring integrally molded within said diaphragmal housing and which expands towards the inner wall surface of the pipeline when heated to its memory transition temperature to flatten the diaphragmal housing to a generally disc shape;
   (c) an adhesive sealing means contained within the trough and which is brought into contact with the inner walls of the pipeline by the force of the expanding spring to produce a seal; and
   (d) an insertion guidance means comprising an array of crossed guides, a guide pin and a spacer, said spacer resting against the interior center of the diaphragmal housing with said guide pin extending outwardly therefrom, said crossed guides being attached at their uncrossed ends to the outer portion of the diaphragmal housing and said crossed guides defining a hole in the center of the crossed area with the guide pin slidably running therethrough.

3. A heat-recoverable pipeline plug comprising:
   (a) a polymeric diaphragmal housing which is generally concavo convex in shape and whose outer peripheral edge defines a trough;
   (b) a heat-recoverable metal spring integrally molded within said diaphragmal housing and which expands towards the inner wall surface of the pipeline when heated to its memory transition temperature; to flatten the diaphragmal housing to a generally disc shape;
   (c) an adhesive sealing means contained within the trough and which is brought into contact with the inner walls of the pipeline by the force of the expanding spring to produce a seal; and
   (d) an insertion guidance means to stabilize plug and to facilitate handling and mounting.

* * * * *

UNITED STATES PATENT AND TRADEMARK OFFICE
CERTIFICATE OF CORRECTION

PATENT NO. : 4,350,183
DATED : September 21, 1982
INVENTOR(S) : James C. Holmes

It is certified that error appears in the above-identified patent and that said Letters Patent are hereby corrected as shown below:

Column 1, line 32, delete "heat" and insert --head--.

Col. 2, line 33, delete "polytechnic" and insert --Polytechnic--.

Col. 2, line 46, delete "for" and insert --from--.

Col. 7, line 19, delete "concono" and insert --concavo--.

Signed and Sealed this

Twentieth Day of March 1984

[SEAL]

Attest:

GERALD J. MOSSINGHOFF

Attesting Officer   Commissioner of Patents and Trademarks